(12) United States Patent
Aaron et al.

(10) Patent No.: US 8,332,938 B2
(45) Date of Patent: *Dec. 11, 2012

(54) DETECTION OF ENCRYPTED PACKET STREAMS USING A TIMER

(75) Inventors: Jeffrey A. Aaron, Atlanta, GA (US); Edgar Vaughan Shrum, Jr., Smyrna, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1320 days.

This patent is subject to a terminal disclaimer.

(21) Appl. No.: 10/943,589

(22) Filed: Sep. 17, 2004

(65) Prior Publication Data

US 2006/0064747 A1    Mar. 23, 2006

(51) Int. Cl.
*G06F 11/00* (2006.01)
*G06F 12/14* (2006.01)
(52) U.S. Cl. ............ 726/22; 726/14; 713/152; 380/250
(58) Field of Classification Search .................. 726/22
See application file for complete search history.

(56) References Cited

U.S. PATENT DOCUMENTS

| | | | |
|---|---|---|---|
| 5,706,406 A | 1/1998 | Pollock | |
| 6,522,658 B1 | 2/2003 | Roccanova | |
| 6,640,248 B1 | 10/2003 | Jorgensen | |
| 6,651,099 B1 | 11/2003 | Dietz et al. | |
| 6,665,725 B1 | 12/2003 | Dietz et al. | |
| 6,771,646 B1 | 8/2004 | Sarkissian et al. | |
| 6,789,116 B1 | 9/2004 | Sarkissian et al. | |
| 6,954,789 B2 | 10/2005 | Dietz et al. | |
| 6,961,331 B2 | 11/2005 | Tokunaga et al. | |
| 6,973,033 B1 | 12/2005 | Chiu et al. | |
| 7,010,687 B2 | 3/2006 | Ichimura | |
| 7,035,289 B2 | 4/2006 | Devine et al. | |
| 7,215,637 B1 | 5/2007 | Ferguson et al. | |
| 7,216,230 B2 | 5/2007 | Suzuki et al. | |
| 7,246,245 B2 | 7/2007 | Twomey | |
| 7,286,667 B1 | 10/2007 | Ryal | |
| 7,289,480 B2 * | 10/2007 | Lundstrom et al. | 370/338 |
| 7,290,028 B2 * | 10/2007 | Brabson et al. | 709/203 |
| 7,299,282 B2 | 11/2007 | Sarkissian et al. | |
| 7,359,979 B2 | 4/2008 | Gentle et al. | |
| 7,385,924 B1 * | 6/2008 | Riddle | 370/235 |
| 7,562,213 B1 * | 7/2009 | Timms | 713/160 |
| 7,564,872 B1 * | 7/2009 | Chawla et al. | 370/468 |
| 2001/0023484 A1 | 9/2001 | Ichimura | |
| 2002/0027923 A1 | 3/2002 | Tokunaga et al. | |
| 2002/0035639 A1 | 3/2002 | Xu | |
| 2002/0059170 A1 | 5/2002 | Vange | |
| 2002/0075805 A1 | 6/2002 | Gupta et al. | |
| 2002/0075875 A1 | 6/2002 | Dravida et al. | |
| 2002/0094081 A1 | 7/2002 | Medvinsky | |
| 2002/0095577 A1 | 7/2002 | Nakamura et al. | |
| 2002/0105911 A1 | 8/2002 | Pruthi et al. | |
| 2003/0016770 A1 | 1/2003 | Trans | |
| 2003/0021296 A1 | 1/2003 | Wee et al. | |
| 2003/0043801 A1 | 3/2003 | Seko | |
| 2003/0068040 A1 | 4/2003 | Wee et al. | |

(Continued)

*Primary Examiner* — Shewaye Galagay
(74) *Attorney, Agent, or Firm* — Myers Bigel Sibley & Sajovec

(57) ABSTRACT

Methods, systems, and devices are disclosed for detecting encrypted Internet Protocol packet streams. The type of data within an encrypted stream of packets is inferred using an observable parameter. The observable parameter is observable despite encryption obscuring the contents of the encrypted stream of packets. A timer is established that maintains settings despite changes in the type of inferred data.

17 Claims, 10 Drawing Sheets

U.S. PATENT DOCUMENTS

| | | |
|---|---|---|
| 2003/0086411 A1 | 5/2003 | Vassilovski |
| 2003/0086515 A1 | 5/2003 | Trans |
| 2003/0097595 A1 | 5/2003 | Partridge et al. |
| 2003/0131228 A1 | 7/2003 | Twomey |
| 2003/0167394 A1 | 9/2003 | Suzuki et al. |
| 2003/0225549 A1 | 12/2003 | Shay et al. |
| 2003/0227907 A1 | 12/2003 | Choi et al. |
| 2003/0231767 A1 | 12/2003 | Carbajal |
| 2003/0235209 A1 | 12/2003 | Garg |
| 2004/0003070 A1 | 1/2004 | Fernald et al. |
| 2004/0008724 A1 | 1/2004 | Devine et al. |
| 2004/0068668 A1 | 4/2004 | Lor et al. |
| 2004/0071130 A1 | 4/2004 | Doerr et al. |
| 2004/0083299 A1 | 4/2004 | Dietz et al. |
| 2004/0090937 A1 | 5/2004 | Chaskar |
| 2004/0090943 A1 | 5/2004 | daCosta |
| 2004/0090989 A1 | 5/2004 | Kobayashi |
| 2004/0109414 A1 | 6/2004 | Choi et al. |
| 2004/0142697 A1* | 7/2004 | Knaebchen et al. ....... 455/452.1 |
| 2004/0199630 A1 | 10/2004 | Sarkissian et al. |
| 2004/0208120 A1 | 10/2004 | Shenoi |
| 2004/0234056 A1 | 11/2004 | Heilmann et al. |
| 2004/0258090 A1 | 12/2004 | Sharafeddine et al. |
| 2004/0260829 A1 | 12/2004 | Husak et al. |
| 2005/0052996 A1 | 3/2005 | Houck et al. |
| 2005/0060539 A1 | 3/2005 | Anspach |
| 2005/0060543 A1 | 3/2005 | Anspach |
| 2005/0120208 A1* | 6/2005 | Albert Dobson ............. 713/160 |
| 2006/0031374 A1 | 2/2006 | Lu et al. |
| 2006/0233362 A1 | 10/2006 | Deans et al. |
| 2007/0060166 A1 | 3/2007 | Kitamura et al. |
| 2007/0288630 A1 | 12/2007 | De Noia et al. |

* cited by examiner

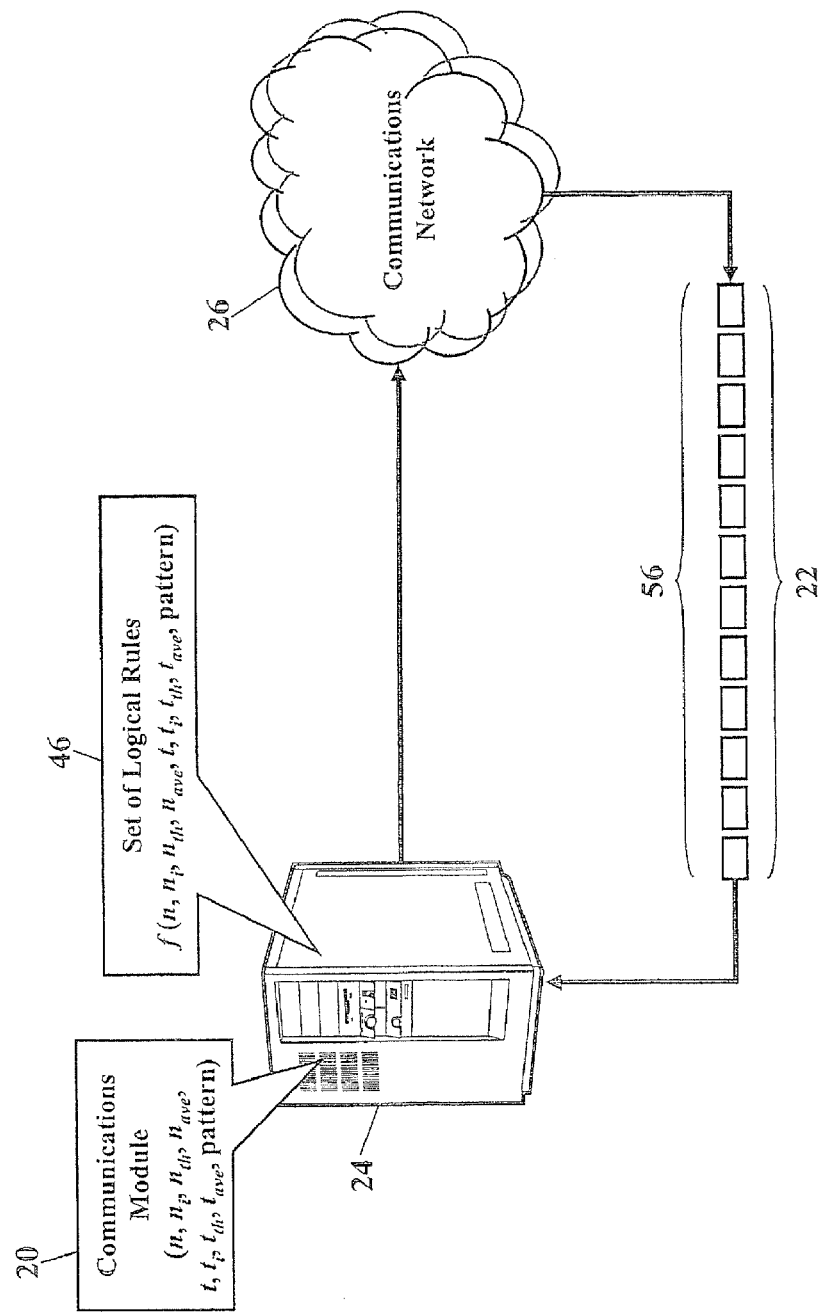

DETECTION OF ENCRYPTED PACKET STREAMS USING A TIMER

CROSS-REFERENCE TO RELATED APPLICATIONS

This application relates to the commonly assigned and concurrently filed U.S. applications: Ser. No. 10/944,229, entitled "Detection of Encrypted Packet Streams"; Ser. No. 10/943,588, entitled "Signature Specification for Encrypted Packet Streams"; Ser. No. 10/944,294, entitled "Detection of Encrypted Packet Streams"; Ser. No. 10/943,590, entitled "Detection of Encrypted Packet Streams Using Process Variation and/or Multiple Processes"; and Ser. No. 10/943,591, entitled "Detection of Encrypted Packet Streams Using Feedback Probing". These commonly-assigned applications are all incorporated by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to communications and, more particularly, to inferring data types in encrypted data streams.

Encryption of communications is increasing. More and more people, businesses, and governments are encrypting their electronic communications. This encryption provides enhanced security and privacy for these electronic communications.

Encryption, however, is a problem for communications service providers. Communications service providers need to know the type of data contained within an electronic communication. Some data types receive priority processing, while other data types are queued for later processing. Encryption, however, hides the contents of the communication and often prevents a communications service provider from determining the level of required processing. Because the communications service provider cannot determine the level of required processing, the encrypted communication defaults to lesser priority and/or processing.

Internet telephony provides an example. Internet telephone calls should be processed to result in a real time, or nearly real time, conversation. If packets are lost, or if packets experience congestion, the quality of the call suffers. Internet telephone calls, then, should receive priority processing. When a communications service provider detects data representing an Internet telephone call, the service provider gives that data priority/special processing to reduce packet loss and to reduce latency effects. Encryption, however, hides the contents of the communication. Encryption prevents the communications service provider from determining whether priority and/or special processing is required. So, even though the communication is an Internet telephone call, encryption causes the communication to default to lesser priority and/or processing. The quality of the call may then suffer from packet loss and congestion.

There is, accordingly, a need in the art for improved determination of data types. When parties encrypt their communications, there is a need for determining the type of data contained inside the encrypted communication. There is also a need for identifying a particular kind of encrypted traffic in order to provide prioritized/specialized processing.

SUMMARY

The aforementioned problems, and other problems, are reduced, according to exemplary embodiments, using methods, computer systems, computer programs, and computer program products that detect the type of data contained within an encrypted stream of packets. According to exemplary embodiments, the existence of one or more parameters within the encrypted stream of packets is noted. The one or more parameters are observable, despite encryption obscuring the contents of the encrypted stream of packets. The observable parameters are then used to infer the type of data contained within the encrypted stream of packets. An inference is made whether the encrypted stream of packets contains, for example, video data, picture data, text data, and/or or voice data. According to the exemplary embodiments, a timer is then established that forcibly maintains network and/or system settings, despite a change in the observable parameter and/or the inferred type of data. The timer forces a communications network to disregard instantaneous, dynamic, and/or random changes in the inferred type of data until the timer expires. When the timer expires, the communications network is then able to react to a different type of inferred data. The timer thus prevents the communications network from implementing hasty changes to network settings.

The exemplary embodiments may utilize various values for the timer. The timer maintains a detection state until expiration. The timer may have variable values, depending upon software applications, protocols, data types, equipment vendors, and versions of equipment and/or software. The timer may vary according to time of day, a day of week, or some other schedule. The timer may also vary according to historical conditions, performance objectives and/or conditions, congestion, delay, latency, jitter, packet loss, and other network factors.

The exemplary embodiments infer a type of data within an encrypted stream of packets using an observable parameter. The observable parameter is observable despite encryption obscuring the contents of the encrypted stream of packets. A timer is established that maintains settings until expiration.

Yet more exemplary embodiments describe a system having a communications module that infers a type of data within an encrypted stream of packets using an observable parameter. The observable parameter is observable despite encryption obscuring the contents of the encrypted stream of packets. The communications module also establishes a timer that maintains settings until expiration.

According to another of the embodiments, a computer program product may be used for data types contained within encrypted packet streams. This computer program product includes computer instructions for inferring data types within an encrypted stream of packets using an observable parameter. The observable parameter is compared to a threshold value. Even if the comparison is unfavorable, the computer or communications device continues processing the encrypted stream of packets as if the inferred data were present until expiration of a timer.

The exemplary embodiments may also be used to infer any type of data. The exemplary embodiments may infer the presence of video data, voice data (such as Voice Over Internet Protocol data), picture data, text data, and all other types of data. The exemplary embodiments, for example, may be used to infer the presence of on-line gaming sessions, simulations, virtual reality, email, messaging, multimedia-conferencing, application-sharing, e-voting, group-ware & collaboration, and any sort or type of video data. The exemplary embodiments can be applied to any encrypted stream which still contains observable parameters having some correlation to the type of data and/or the type of application/service and/or the specific application/service. The concepts described herein can help not just the type of data or application being used and communicating within the encrypted stream, but the concepts can also help identify the actual vendor-make, model, and version of a software application being used (e.g., Vendor A may use different packet sizes than Vendor B, and version 3 from Vendor A uses different inter-packet timing than version 1 from Vendor A). Whenever an encrypted stream contains observable parameters, the exemplary embodiments described herein exploit any correlation to the observable parameters.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments of the present invention are better understood when the following Detailed Description is read with reference to the accompanying drawings, wherein:

FIG. 10 is a schematic illustrating another observable parameter, according to more embodiments;

DETAILED DESCRIPTION

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, the type of data contained within an encrypted stream of packets is detected. A timer is then established that forcibly maintains settings, despite a change in the observable parameter and/or the inferred type of data. The timer forces a communications network and/or communications device to disregard instantaneous, dynamic, and/or random changes in the inferred type of data until the timer expires. When the timer expires, the communications network/device is then able to react to a different type of inferred data. The timer thus prevents the communications network/device from implementing hasty changes to network settings. The timer may also compensate for dynamically unreliable detection and/or dynamism in network performance that may affect detection.

Figure 1:
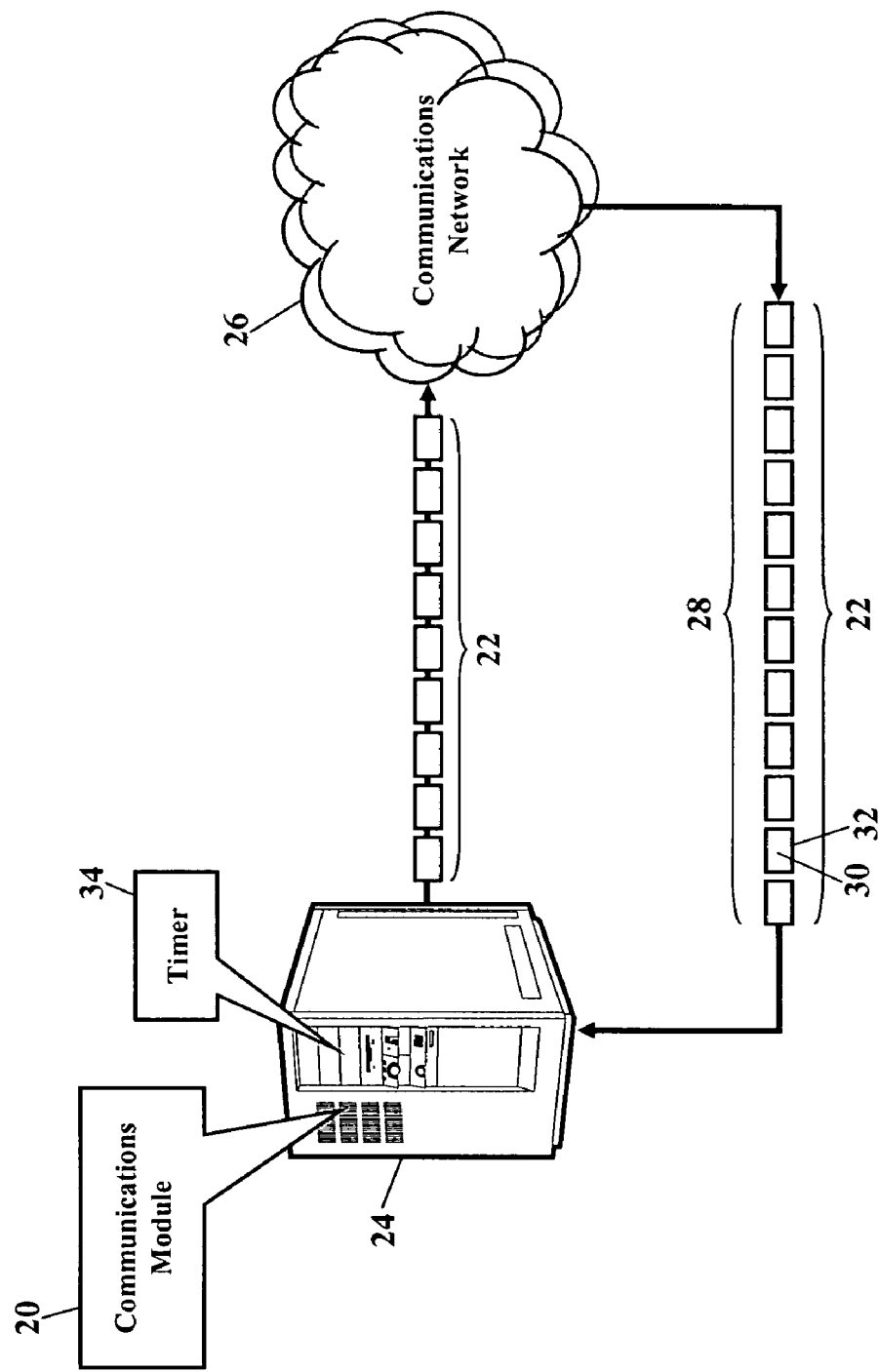
FIG. 1 is a schematic illustrating the exemplary embodiments.

FIG. 1 is a schematic illustrating the exemplary embodiments. A communications module 20 comprises methods, systems, computer programs, and/or computer program products that help provide communications services. The communications module 20 detects an encrypted stream 22 of Internet Protocol packets. The communications module 20 operates within any computer system, such as a communications server 24. The communications module 20 receives the encrypted stream 22 of packets via a communications network 26. Because the stream 22 of packets is encrypted, the encryption obscures the contents of the stream 22 packets. The communications module 20, however, is able to discern one or more observable parameters 28 within the encrypted stream 22 of packets. The communications module 20 is able to observe the parameters 28, despite encryption obscuring the contents 30 of each packet 32 within the stream 22 of packets. Each parameter 28 describes some characteristic that might be observed within the stream 22 of packets, despite the encryption. Although there are many observable parameters, this patent will not describe in detail the observable parameters 28. If the reader desires to learn more about the observable parameters 28, the reader is invited to consult the commonly assigned and concurrently filed U.S. application Ser. No. 10/944,229, entitled "Detection of Encrypted Packet Streams", incorporated herein by reference.

The communications module 20 compares the observable parameters 28 to the actual characteristics of the encrypted stream 22 of packets. The communications module 20 observes the stream 22 of packets and notes whether any of the observable parameters 28 occurs and/or exists within the encrypted stream 22 of packets. The communications module 20 compares the observable parameters 28 to threshold values and infers the type of data contained within the encrypted stream 22 of packets.

Once the type of data is inferred, a timer 34 is established. This timer 34 forces the communications module 20 to maintain the type of inferred data until expiration of the timer 34. The timer 34 helps reduce abrupt and/or hasty network changes due to changing characteristics in the encrypted stream 22 of packets. Even subtle changes within the encrypted stream 22 of packets may cause the communications module 20 to infer a different data type is present. Slight changes in packet sizes, timing intervals, and/or other observable parameters may fool the communications module 20 into thinking the data type has changed. Instantaneous, dynamic, and/or random changes within the encrypted stream 22 of packets could cause the communications module 20 to infer a different type of data is present and, therefore, to change network settings.

The timer 34, however, helps maintain a steady-state of detection. The timer 34 maintains a pseudo-detection state that prevents the communications module 20 from inferring a new type of data until the timer 34 expires. The communications module 20, for example, would continue to infer the presence of Voice Over Internet Protocol data until the timer 34 expires, despite changes in packet sizes, timing intervals, and/or other observable parameters. These changes in the detected observable parameters 28 could cause the communications module 20 to infer a different type of data is present, when this is not actually the case. The timer 34, however, gives the detected values of the observable parameters 28 an opportunity to settle down and confirm that the data type has really changed. The timer 34 thus prevents the communications network 20 from reacting too quickly to changes in the stream 22 of packets.

The timer 34 may have different values for different circumstances. The timer 34 may have any value from a small fraction of a second to hours. The timer 34 may, therefore, have differing values depending upon network conditions, network performance, data types, vendor equipment models and/or manufacturers, software applications, and even times of day and/or days of week. Some protocols, for example, may require different or unique timer values for optimum performance. Some Codec specifications may cause the communications network 26 to be stable, while others produce undesirable or even unstable conditions. The timer 34 may be chosen to help compensate for codec-inspired conditions. The performance of the communications network 26 may change at different times of the day/week, so the timer 34 may be chosen according to a schedule that best suits network conditions. Historical information may cause the communications module 20 to implement different timer values, thus achieving more or less hysteresis, thereby providing appropriate compensation.

The timer 34 may also have a value that varies with other circumstances. Packet congestion, delay, latency, and packet loss within the communications network 26 are all circumstances that may vary the value of the timer 34. A particular vendor's computer equipment, configuration parameters, and even model may require differing/unique timer values. A particular developer's software application may differently perform from another developer's, thus requiring a different timer 34. Even differing protocols may require different timer values.

Figure 2:
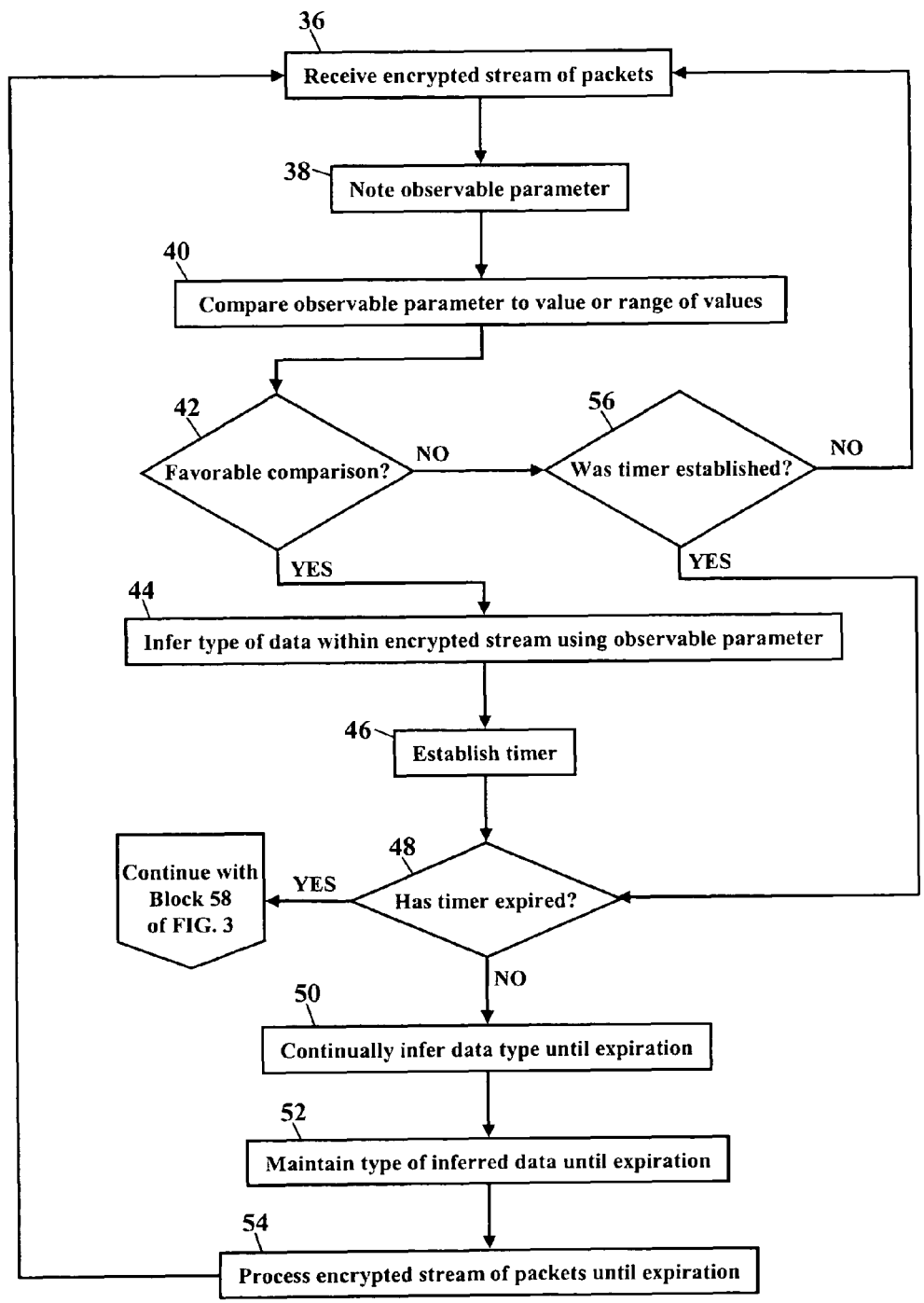
FIGS. 2 and 3 are flowcharts illustrating a method of detecting encrypted packet streams, according to more exemplary embodiments.
Figure 3:
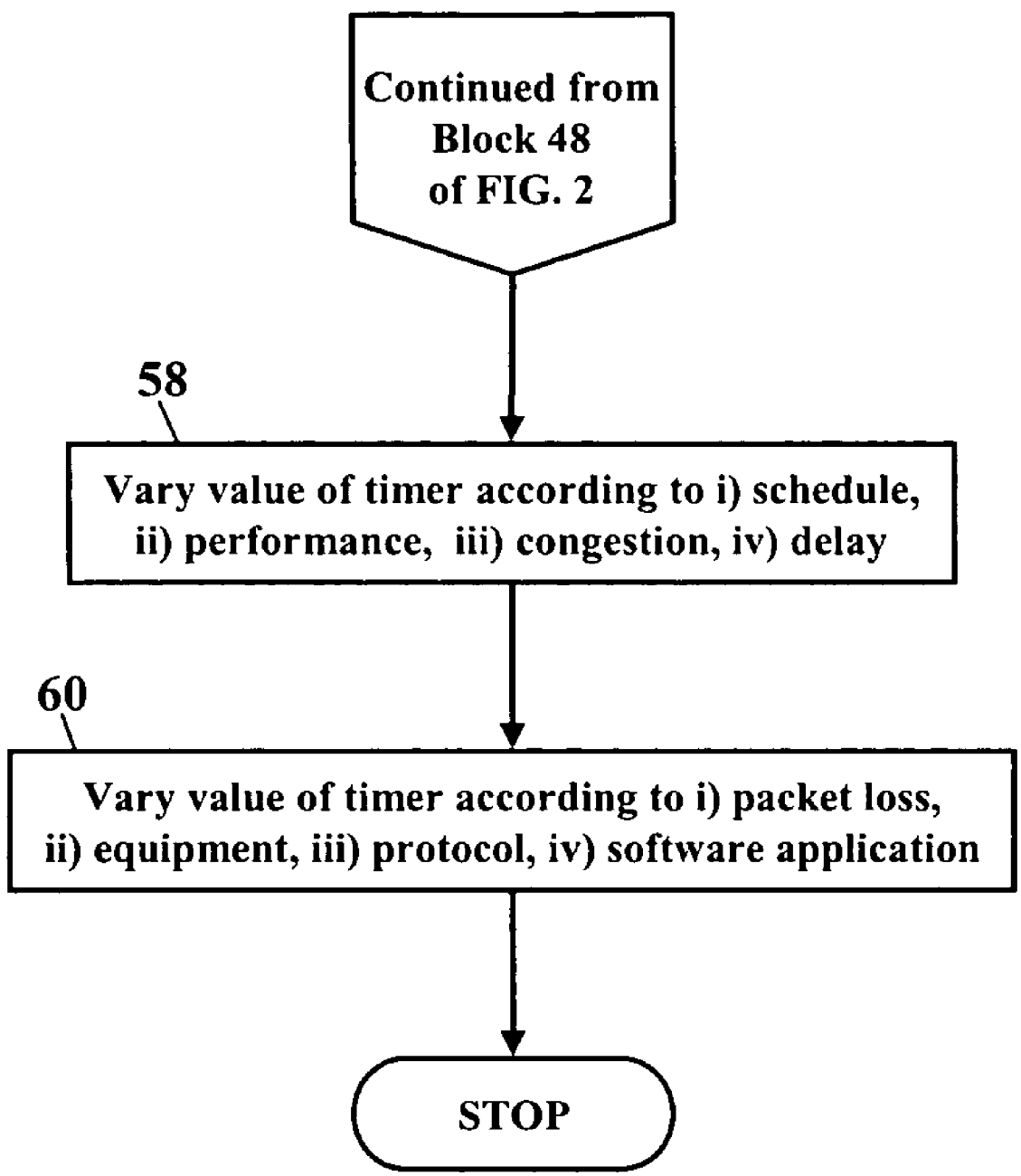

FIGS. 2 and 3 are flowcharts illustrating a method of detecting encrypted packet streams, according to more exemplary embodiments. An encrypted stream of packets is received (Block 36). An observable parameter is noted (Block 38). The observable parameter is observable despite encryption obscuring the contents of the encrypted stream of packets. The observable parameter is compared to a threshold value or range of values (Block 40). If the comparison is favorable (Block 42), then the type of data within the encrypted stream of packets is inferred using the observable parameter (Block 44). A timer is established (Block 46) and continually checked for expiration (Block 48). Unless the timer has expired (Block 48), the encrypted stream of packets is continually inferred (Block 50), maintained (Block 52), processed (Block 54), and received (Block 36). If, however, the comparison is unfavorable (Block 42)—that is, the comparison does not result in an inference of the data type within the encrypted stream—and if no timer was established (Block 56), then the encrypted stream of packets is continually received and the existence of an observable parameter is continually noted (Blocks 36-42). When the comparison is unfavorable (Block 42) and when the timer is established (Block 56) and not expired (Block 48) is the type of data continually inferred (Block 50), maintained (Block 52), and processed (Block 54), despite a change in the type of inferred data and/or in the observable parameter.

The flowchart continues with FIG. 3. When the comparison is unfavorable, and when the timer expires (Blocks 42 and 48 of FIG. 2), then the value of the timer may be varied according to schedule, performance, congestion, and/or delay (Block 58). The value of the timer may be additionally or alternatively varied according to packet loss, vendor equipment, protocol, and/or software application (Block 60).

Figure 4:
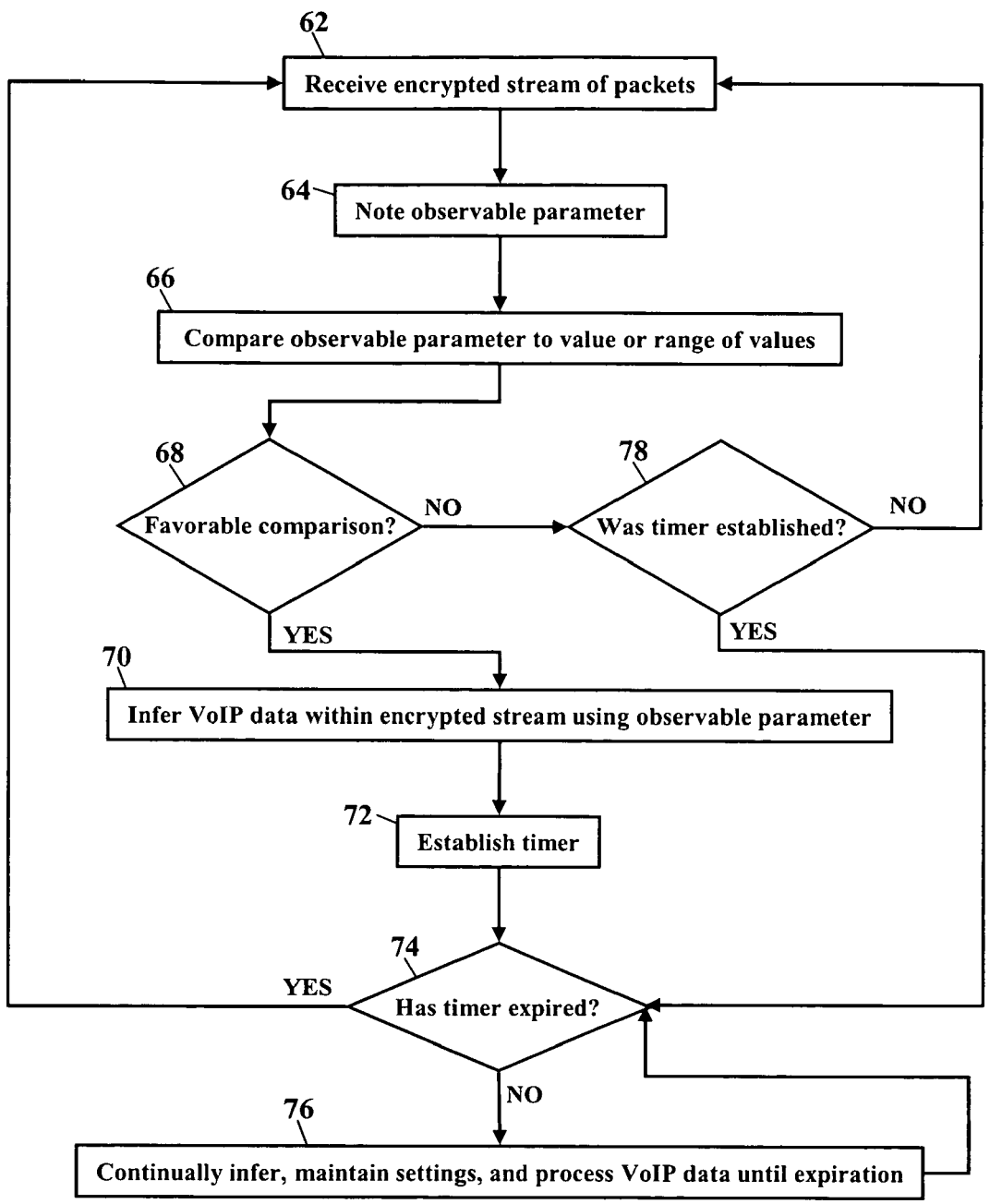
FIG. 4 is a flowchart illustrating a method of detecting encrypted Voice Over Internet Protocol data, according to even more exemplary embodiments.

FIG. 4 is a flowchart illustrating a method of inferring Voice Over Internet Protocol data in an encrypted stream of packets, according to still more exemplary embodiments. An encrypted stream of packets is received (Block 62). An observable parameter is noted (Block 64). The observable parameter is observable despite encryption obscuring the contents of the encrypted stream of packets. The observable parameter is compared to a threshold value or a range of values (Block 66). If the comparison is favorable (Block 68), then the existence of VoIP data within the encrypted stream of packets is inferred using the observable parameter (Block 70). A timer is established (Block 72) and continually checked for expiration (Block 74). Unless the timer has expired (Block 74), the encrypted stream of packets is continually inferred, maintained, and processed (Block 76), despite any change in the observable parameter. If, however, the comparison is unfavorable (Block 68), and if no timer was established (Block 78), then the encrypted stream of packets is continually received and the existence of an observable parameter is continually noted (Blocks 62-68). When the comparison is unfavorable (Block 68) and when the timer is expired (Block 74), then a new data type may be inferred (Blocks 62-68).

The communications module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the communications module to be easily disseminated. A computer program product for detecting the type of data contained within an encrypted stream of packets includes the communications module stored on the computer-readable medium. The communications module includes computer-readable instructions for inferring Voice Over Internet Protocol data within an encrypted stream of packets using an observable parameter. The observable parameter is observable despite encryption obscuring the contents of the encrypted stream of packets. The communications module continues inferring the existence of the Voice Over Internet Protocol data until expiration of a timer. The communications module continues processing the encrypted stream of packets as if the Voice Over Internet Protocol data were present until expiration of the timer.

The communications module may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

Figure 5:
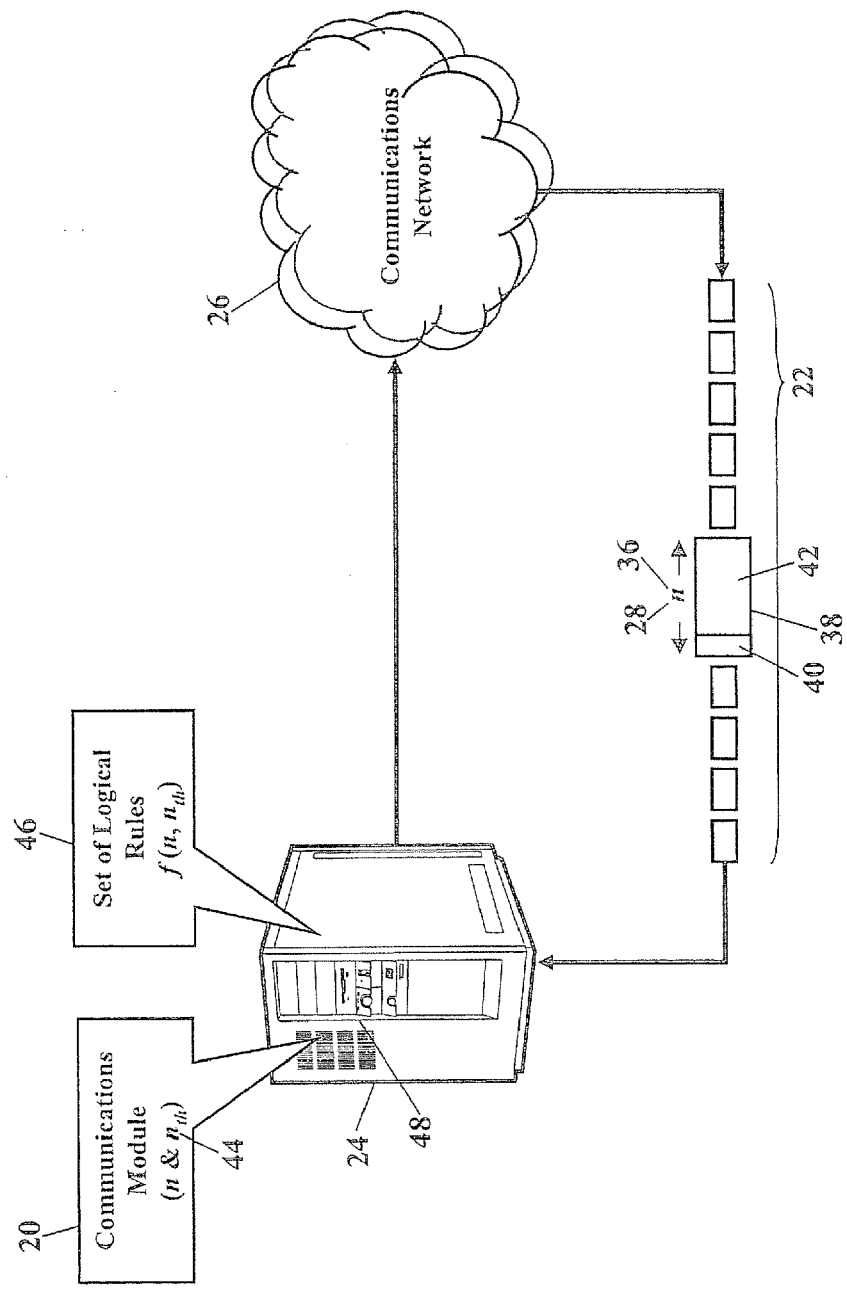
FIGS. 5 and 6 are schematics illustrating an observable parameter, according to the exemplary embodiments.
Figure 6:
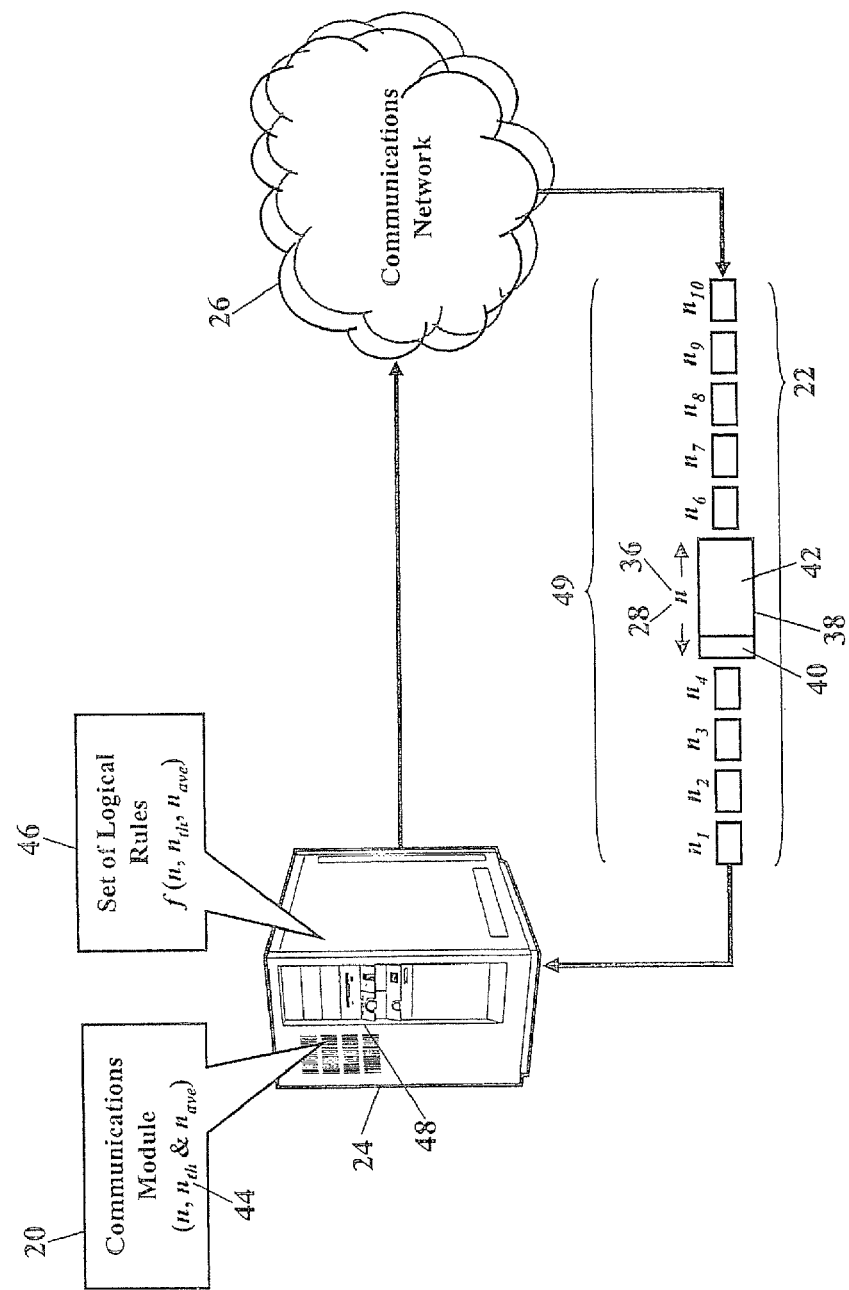

FIGS. 5 and 6 are schematics illustrating an exemplary observable parameter 28, according to the exemplary embodiments. Here the exemplary observable parameter 28 is a bit size n (shown as reference numeral 36) of an encrypted packet 38 within the stream 22 of packets. The communications module 20 receives the encrypted stream 22 of packets. Because the stream 22 of packets is encrypted, the encryption obscures the contents of the stream 22 packets. The communications module 20, however, is able to note the size n (shown as reference numeral 36) of an encrypted packet 38 within the stream 22 of packets. The encrypted packet 38 is shown enlarged for clarity. That is, although encryption obscures the contents of the packet 38, the communications module 20 is still able to note a bit size and/or length of the encrypted packet 38. The size n of the encrypted packet 38 may be divided between a header portion 40 and a payload portion 42. The communications module 20 is able to discern, read, observe, measure, or otherwise note the bit size and/or length of the packet 38, the header portion 40, and/or the payload portion 42.

The communications module 20 may then compare the size n of the encrypted packet 38. The communications module 20 may measure the size n of the encrypted packet 38, and then use the size n to determine what type of data is contained within the encrypted packet 38. The communications module 20, for example, may compare the size n of the encrypted packet 38 to a threshold packet size $n_{th}$ (shown as reference numeral 44) or, alternatively, to a range of sizes for the packets. The threshold packet size $n_{th}$, or alternately the range of packet sizes, describes a known packet size of a known type of data. The threshold packet size $n_{th}$, for example, might be a known value for packets containing video data, text file data, picture data, and/or any other known type of data. If the packet size n satisfies the threshold packet size $n_{th}$, then the communications module 20 can infer the type of data contained within the encrypted packet 38 matches the known type of data corresponding to the threshold packet size $n_{th}$.

The communications module 20 may even consult a set of logical rules. As FIG. 5 shows, the communications module 20 may consult a set 46 of logical rules stored in a memory 48 of the communications server 24. The set 46 of logical rules could contain some mathematical expression and/or algorithm involving the packet size n and/or the threshold packet size $n_{th}$. The result of this mathematical expression/algorithm could help the communications module 20 infer the type of data contained within the encrypted packet 38. If, for example, the packet size n equals or exceeds a minimum threshold packet size $n_{th\text{-}min}$, then the communications module 20 may infer that the type of data contained within the encrypted packet 38 matches the known type of data corresponding to the threshold packet size $n_{th}$. If, however, the packet size n is less than the minimum threshold packet size $n_{th\text{-}min}$, then the communications module 20 may decline to infer the type of data contained within the encrypted packet 38. Conversely, for example, if the packet size n equals or exceeds a maximum threshold packet size $n_{th\text{-}max}$, then the Communications Module 20 may decline to infer that the type of data contained within the encrypted packet 38 matches the known type of data corresponding to the threshold packet size $n_{th}$. If, however, the packet size n is less than the maximum threshold packet size $n_{th\text{-}max}$, then the Communications Module 20 may infer the type of data contained within the encrypted packet 38. Note that expected packet sizes and packet size ranges may also be used to determine whether to infer or decline to infer, such that if the measured value matches the expected value or lies within the expected range, the inference is made, while if the measured value does not match the expected value or lies outside the expected range, the inference is declined. The set 46 of logical rules could contain any mathematical expression/algorithm that may help the communications module 20 infer the type of data contained within the encrypted packet 38.

FIG. 6 further illustrates an exemplary observable parameter 28, according to exemplary embodiments. Here the exemplary observable parameter 28 may be the size $n_i$ of each encrypted packet, the threshold packet size $n_{th}$, and/or a computed average packet size $n_{ave}$ for an entire series 49 of packets. As FIG. 6 shows, the stream 22 of packets may contain the series 49 of packets, and the communications module 20 may measure the size $n_i$ of each encrypted packet within the series 49 of packets. The communications module 20 may compare the size $n_i$ of each encrypted packet to the threshold packet size $n_{th}$ (shown as reference numeral 44). The communications module 20 may alternatively or additionally compute an average packet size $n_{ave}$ for the series 49 of packets, and the communications module 20 may compare the average packet size $n_{ave}$ to the threshold packet size $n_{th}$. The communications module 20 could consult the set 46 of logical rules for any mathematical expression/algorithm involving the size $n_i$ of each encrypted packet, the average packet size $n_{ave}$, and/or the threshold packet size $n_{th}$. The communications module 20 may then infer the type of data contained within the series 49 of packets.

Figure 7:
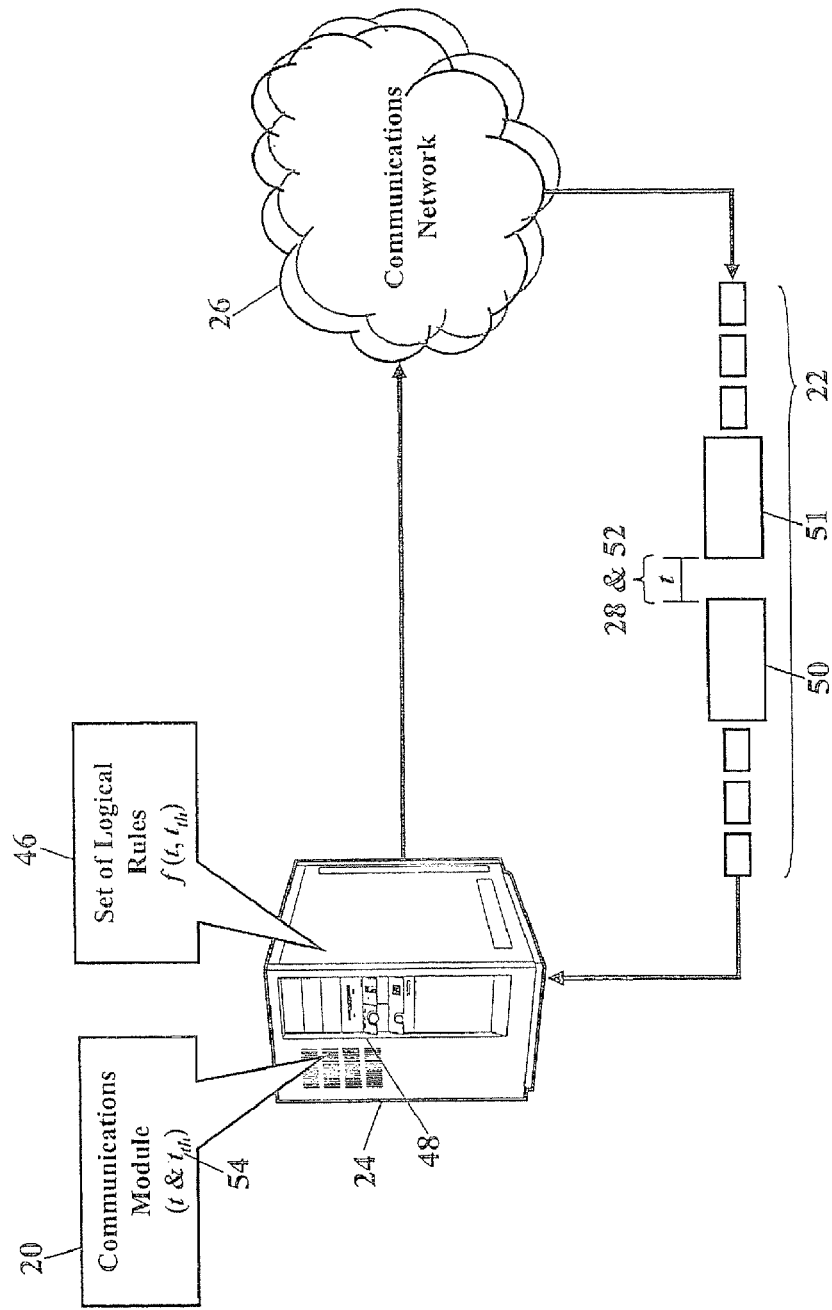
FIGS. 7 and 8 are schematics illustrating another observable parameter, according to more embodiments.
Figure 8:
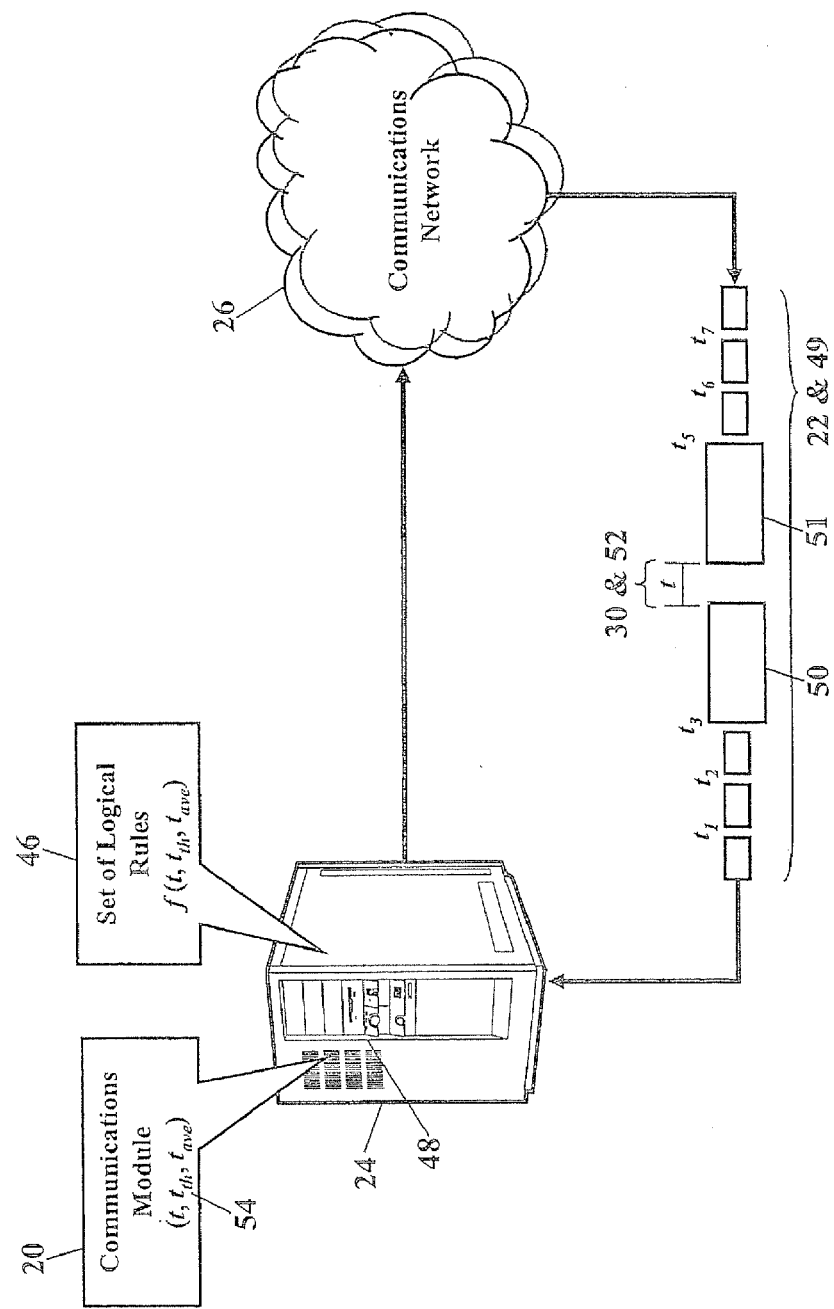

FIGS. 7 and 8 are schematics illustrating another observable parameter 28, according to more embodiments. Here the observable parameter 28 is a timing interval t between adjacent encrypted packets. The communications module 20, as before, receives the encrypted stream 22 of packets. Because the stream 22 of packets is encrypted, the encryption obscures the contents of the stream 22 packets. The communications module 20, however, is able to note the timing interval t between adjacent encrypted packets 50 and 51 (the timing interval t is shown as reference numeral 52). The adjacent encrypted packets 50, 51 and the timing interval t are shown enlarged for clarity. Although encryption obscures the contents of the adjacent packets 50 and 51, the communications module 20 is still able to discern, read, observe, measure, or otherwise note the timing interval t between the adjacent encrypted packets 50 and 51.

The communications module 20 may then compare the timing interval t. The communications module 20 may measure the timing interval t, and then use the timing interval t to determine what type of data is contained within the adjacent packets 50 and 51 and/or the encrypted stream 22 of packets. The communications module 20, for example, may compare the timing interval t to a threshold timing interval $t_{th}$ (shown as reference numeral 54) or, alternately, a range of timing intervals. The threshold timing interval $t_{th}$ or, alternatively, the range of timing intervals, describes a known timing interval of a known type of data. The threshold timing interval $t_{th}$, for example, might be a known value for adjacent packets containing video data, text file data, audio data, picture data, and/or any other known type of data. If the timing interval t satisfies the threshold timing interval $t_{th}$, then the communications module 20 can infer the type of data contained within the adjacent packets 50 and 51 matches the known type of data corresponding to the threshold timing interval $t_{th}$.

The communications module 20 may also consult the set 46 of logical rules. The set 46 of logical rules could contain some mathematical expression and/or algorithm involving the timing interval t and/or the threshold timing interval $t_{th}$. The result of this mathematical expression/algorithm could help the communications module 20 infer the type of data contained within the adjacent packets 50 and 51. If, for example, the timing interval t equals or exceeds the minimum threshold timing interval $t_{th-min}$, then the communications module 20 may infer that the type of data contained within the adjacent packets 50 and 51 matches the known type of data corresponding to the minimum threshold timing interval $t_{th-min}$. If, however, the timing interval t is less than the minimum threshold timing interval $t_{th-min}$, then the communications module 20 may decline to infer the type of data contained within the adjacent packets 50 and 51. Conversely, for example, if the timing interval t equals or exceeds a maximum threshold timing interval $t_{th-max}$, then the Communications Module 20 may decline to infer that the type of data contained within the adjacent packets 50 and 51 matches the known type of data corresponding to the threshold timing interval $t_{th-max}$. If, however, the timing interval t is less than the maximum threshold timing interval $t_{th,max}$, then the Communications Module 20 may infer the type of data contained within the adjacent packets 50 and 51. Note that expected timing intervals and timing interval ranges may also be used to determine whether to infer or decline to infer, such that if the measured value matches the expected value or lies within the expected range, the inference is made, while if the measured value does not match the expected value or lies outside the expected range, the inference is declined. The set 46 of logical rules could contain any mathematical expression/algorithm that may help the communications module 20 infer the type of data contained within the adjacent packets 50 and 51.

FIG. 8 further illustrates an exemplary observable parameter 28, according to exemplary embodiments. Here the observable parameter 28 may include the timing interval $t_i$ between adjacent packets, the threshold timing interval $t_{th}$, and/or a computed average timing interval $t_{ave}$ for the series 49 of packets. As FIG. 8 illustrates, the communications module 20 may compare the timing interval $t_i$ between adjacent packets within the series 49 of packets. The communications module 20 may then compare one or more of the timing intervals $t_i$ to the threshold timing interval $t_{th}$. The communications module 20 may alternatively or additionally compute an average timing interval $t_{ave}$ for the series 49 of packets, and the communications module 20 may compare the average timing interval $t_{ave}$ to the threshold timing interval $t_{th}$. The communications module 20 could consult the set 46 of logical rules for any mathematical expression/algorithm involving the timing intervals $t_i$, the average timing interval $t_{ave}$, and/or the threshold timing interval $t_{th}$. The communications module 20 may then infer the type of data contained within the series 49 of packets.

Figure 9:
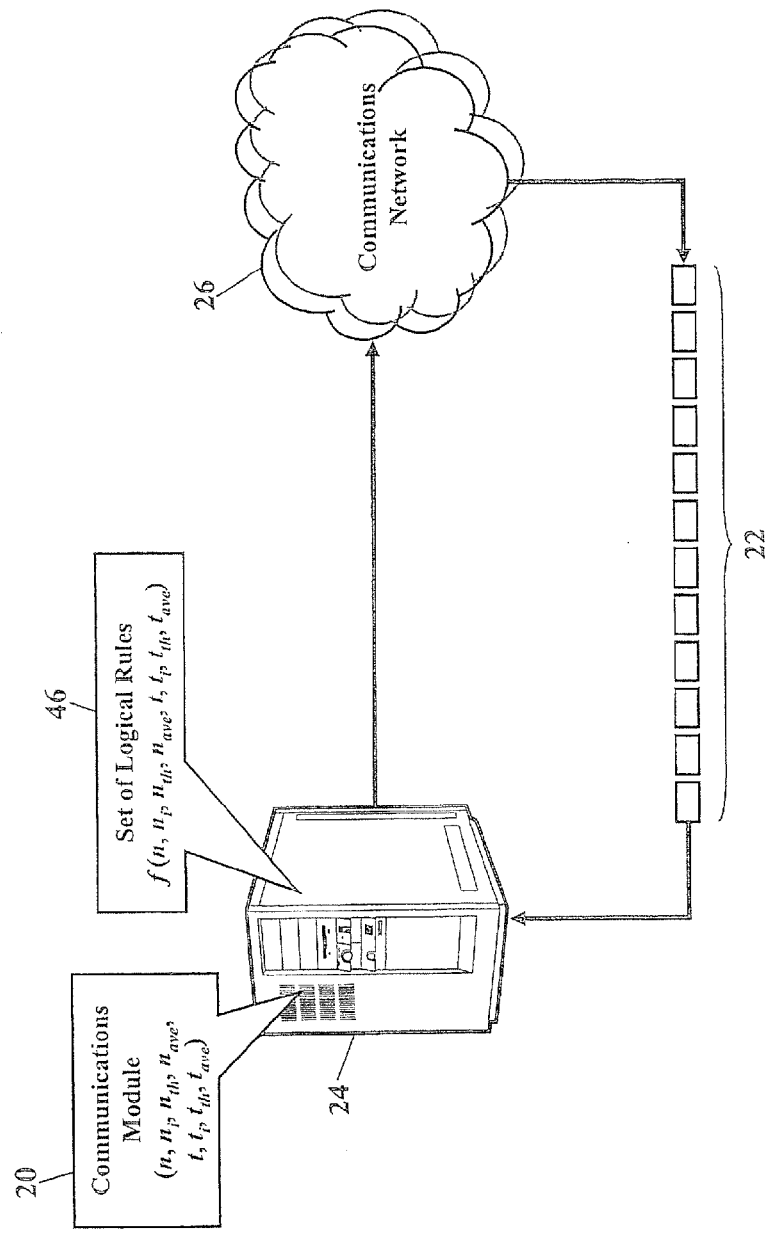
FIG. 9 is a schematic further illustrating the set of logical rules, according to more embodiments.

FIG. 9 is a schematic further illustrating a set of logical rules, according to more embodiments. The set 46 of logical rules may contain some mathematical expression and/or algorithm involving the size $n_i$ of each encrypted packet, the threshold packet size $n_{th}$, the average packet size $n_{ave}$, the timing interval t, the threshold timing interval $t_{th}$, and/or the average timing interval $t_{ave}$. The result of this mathematical expression/algorithm could help the communications module 20 infer the type of data contained within the encrypted stream 22 of packets.

FIG. 10 is a schematic illustrating another observable parameter, according to more exemplary embodiments. Here the observable parameter 28 is a pattern 56 within the encrypted stream 22 of packets. The communications module 20 may measure, recognize, discern, read, observe, or otherwise note the recognizable pattern 56 within the encrypted stream 22 of packets. The pattern 56 may involve, in any combination, any of the observable parameters, such as the size $n_i$ of each encrypted packet, the threshold packet size $n_{th}$, the minimum threshold packet size $n_{th-min}$, the maximum threshold packet size $n_{th-max}$, the average packet size $n_{ave}$, and/or a range of packet sizes. The pattern 56 may involve, in any combination, the timing interval t, the threshold timing interval $t_{th}$, the minimum threshold timing interval $t_{th-min}$, the maximum threshold timing interval $t_{th-max}$, the average timing interval $t_{ave}$, and/or a range of timing intervals. The pattern 56 may additionally or alternatively involve a constant, or nearly constant, packet size $n_i$ within the stream 22 of packets. The pattern 56 may additionally or alternatively involve a constant, or nearly constant, timing interval $t_i$ between adjacent packets within the stream 22 of packets. The pattern 56 may additionally or alternatively involve a constant, or nearly constant, presence of transmitted packets from a particular originating communications device and/or address, or from a particular set of same. The pattern 56 may additionally or alternatively involve a constant, or nearly constant, presence of packets destined to a particular terminating communications device and/or address, or to a particular set of same. The pattern 56 may additionally or alternatively involve recognizable/repeating periods of packets interspersed with recognizable/repeating periods of no packets. Some originating communications devices and/or addresses may generate so much traffic that the type of data within the stream 22 of packets is automatically inferred (such as voice data). Some terminating communications devices and/or addresses, likewise, may receive so much traffic that the type of data within the stream 22 of packets is automatically inferred. Whatever the pattern 56 may indicate, the communications module 20 is able to note the pattern 56 and infer the type of data within the stream 22 of packets.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A computer implemented method, comprising:
    estimating a type of data within an encrypted stream of packets based on detecting an observable parameter, the observable parameter being observable despite encryption obscuring contents of the encrypted stream of packets, wherein the observable parameter is observed without decrypting the stream of packets, and wherein the observable parameter is outside the encrypted stream of packets;
    establishing a timer that depends on the type of data within the encrypted stream to provide a time interval during which no further estimation of the type of data within the encrypted stream of packets is performed;

processing the encrypted stream of packets until expiration of the time interval, despite a change in the type of estimated data, wherein establishing the type of data and establishing the timer are performed on at least one processor;

estimating that Voice Over Internet Protocol data is included within the encrypted stream of packets based on detection of the observable parameter; and continue estimating that the Voice Over Internet Protocol data is included in the encrypted stream of packets until expiration of the time interval.

2. The method according to claim 1, further comprising maintaining the type of estimated data until expiration of the time interval.

3. The method according to claim 1, further comprising comparing the observable parameter to a threshold value.

4. The method according to claim 3, wherein if the comparison is unfavorable, maintaining the type of estimated data until expiration of the timer.

5. The method according to claim 1, further comprising varying a value of the time interval according to congestion.

6. The method according to claim 1, further comprising varying a value of the time interval according to a software application.

7. The method according to claim 1, further comprising comparing the observable parameter to an actual characteristic of the encrypted stream of packets.

8. A system, comprising:
a communications module stored in a memory device, and
a processor communicating with the memory device;
the communications module estimating a type of data within an encrypted stream of packets based on detecting an observable parameter, the observable parameter being observable despite encryption obscuring contents of the encrypted stream of packets, wherein the observable parameter is observed without decrypting the stream of packets, and wherein the observable parameter is outside the encrypted stream of packets; and
the communications module establishing a timer that depends on the type of data within the encrypted stream to provide a time interval during which no further estimation of the type of data with the encrypted stream of packets is performed, wherein the communications module maintains the type of estimated data until expiration of the time interval despite a change in the observable parameter, wherein the communications module i) estimates that Voice Over Internet Protocol data is included within the encrypted stream of packets using the observable parameter, and ii) continues estimating that the Voice Over Internet Protocol data is included within the encrypted stream of packets until expiration of the time interval.

9. The system according to claim 8, wherein the communications module processes the encrypted stream of packets until expiration of the time interval.

10. The system according to claim 8, wherein the communications module compares the observable parameter to a threshold value.

11. The system according to claim 10, wherein if the comparison is unfavorable, the communications module maintains the type of estimated d until expiration of the timer.

12. The system according to claim 8, wherein the communications module varies a value of the time interval according to a schedule.

13. The system according to claim 8, wherein the communications module varies time interval according to a protocol.

14. The system according to claim 8, wherein estimating the type of data within the encrypted stream of packets includes comparing the observable parameter to an actual characteristic of the encrypted stream of packets.

15. An article of manufacture including a memory including instructions when executed by a computer performing:
estimating a type of data within an encrypted stream of packets based on detecting an observable parameter, the observable parameter being observable despite encryption obscuring contents of the encrypted stream of packets, wherein the observable parameter is observed without decrypting the stream of packets, and wherein the observable parameter is outside the encrypted stream of packets; and
establishing a timer that depends on the type of data within the encrypted stream to provide a time interval during which no further estimation of the type of data with the encrypted stream of packets is performed,
wherein the memory further includes instructions for applying quality of service processing until expiration of the time interval, despite a change in the observable parameter; and
wherein the memory further includes instructions for performing: estimating that Voice Over Internet Protocol data is included within the encrypted stream of packets based on detecting the observable parameter; and
continuing estimating that the Voice Over Internet Protocol data is included in the encrypted stream of packets until expiration of the time interval.

16. The article of manufacture according to claim 15, wherein the memory further includes instructions for processing the encrypted stream of packets until expiration of the time interval.

17. The article of manufacture according to claim 15, wherein estimating the type of data comprises comparing the observable parameter to an actual characteristic of the encrypted stream of packets.

\* \* \* \* \*